United States Patent
Wu

(10) Patent No.: US 8,204,284 B2
(45) Date of Patent: Jun. 19, 2012

(54) FINGERPRINT IDENTIFYING SYSTEM USING A SET OF MICROSTRUCTURE LAYERS FORMED ON ONE OF TOP AND BOTTOM FACES OF LIGHT-TRANSMISSIVE FINGER PRESS PLATE

(75) Inventor: Jen-Chieh Wu, Pingtung County (TW)

(73) Assignee: Gingy Technology Inc., Hsinchu (TW)

( * ) Notice: Subject to any disclaimer, the term of this patent is extended or adjusted under 35 U.S.C. 154(b) by 538 days.

(21) Appl. No.: 12/460,017

(22) Filed: Jul. 10, 2009

(65) Prior Publication Data
US 2010/0208954 A1 Aug. 19, 2010

(30) Foreign Application Priority Data
Feb. 19, 2009 (TW) ................................ 98105275 A

(51) Int. Cl.
*G06K 9/00* (2006.01)
(52) U.S. Cl. ........ 382/124; 382/100; 382/115; 382/125; 382/126; 382/127; 427/1
(58) Field of Classification Search .................. None
See application file for complete search history.

(56) References Cited

U.S. PATENT DOCUMENTS

| | | | |
|---|---|---|---|
| 5,177,802 A | 1/1993 | Fujimoto et al. | |
| 5,448,649 A | 9/1995 | Chen et al. | |
| 5,619,586 A | 4/1997 | Sibbald | |
| 5,732,148 A | 3/1998 | Keagy et al. | |
| 5,796,858 A | 8/1998 | Zhou et al. | |
| 6,069,969 A | 5/2000 | Keagy et al. | |
| 6,097,035 A | 8/2000 | Belongie et al. | |
| 6,150,665 A | 11/2000 | Suga | |
| 6,665,427 B1 | 12/2003 | Keagy et al. | |
| 6,806,483 B2 * | 10/2004 | Iihama et al. | 250/556 |
| 6,950,539 B2 | 9/2005 | Bjorn et al. | |
| 7,130,456 B2 | 10/2006 | Hillmann | |
| 7,245,745 B2 * | 7/2007 | Nagasaka et al. | 382/115 |
| 7,515,252 B2 * | 4/2009 | Hernandez | 356/71 |
| 7,957,563 B2 * | 6/2011 | Kiyomizu et al. | 382/115 |
| 2002/0150284 A1 * | 10/2002 | Iwai | 382/124 |
| 2004/0252867 A1 * | 12/2004 | Lan et al. | 382/124 |
| 2005/0047632 A1 * | 3/2005 | Miura et al. | 382/124 |
| 2008/0298649 A1 * | 12/2008 | Ennis et al. | 382/125 |

FOREIGN PATENT DOCUMENTS

| | | |
|---|---|---|
| CN | 1474212 A | 2/2004 |
| CN | 101261338 A | 9/2008 |

* cited by examiner

*Primary Examiner* — Matthew Bella
*Assistant Examiner* — Jason Heidemann
(74) *Attorney, Agent, or Firm* — Morris Manning & Martin LLP; Tim Tingkang Xia, Esq.

(57) ABSTRACT

A fingerprint identifying system includes a light source, a light-transmissive finger press plate, and an image-capturing unit. The light-transmissive finger press plate is disposed to receive light from the light source, and has a top face adapted to contact a finger, a bottom face, and at least one first microstructure layer formed on at least one of the top and bottom faces of the light-transmissive finger press plate for guiding the light received from the light source to uniformly scatter. The image-capturing unit is disposed below the light-transmissive finger press plate.

11 Claims, 9 Drawing Sheets

FINGERPRINT IDENTIFYING SYSTEM USING A SET OF MICROSTRUCTURE LAYERS FORMED ON ONE OF TOP AND BOTTOM FACES OF LIGHT-TRANSMISSIVE FINGER PRESS PLATE

CROSS-REFERENCE TO RELATED APPLICATION

This application claims priority of Taiwanese Application No. 098105275, filed on Feb. 19, 2009.

BACKGROUND OF THE INVENTION

1. Field of the Invention

The invention relates to a fingerprint identifying system, more particularly to a fingerprint identifying system having an improved identification rate.

2. Description of the Related Art

Referring to FIG. 1, a conventional fingerprint identifying system 1 includes an image-capturing unit 11, a finger press plate 12, a light-diffusion plate 13 disposed between the image-capturing unit 11 and the finger press plate 12, and a plurality of light sources 14 disposed below the light-diffusion plate 13. The finger press plate 12 has a press surface 121 for disposing a finger (A) thereon. The light-diffusion plate 13 guides the light from the light sources 14 so as to serve as a planar light source transmitting light toward the finger press plate 12, and has a through hole 131 in alignment with the image-capturing unit 11. When the light from the light-diffusion plate 13 illuminates the finger (A) disposed on the press surface 121 of the finger press plate 12, the light illuminating the grooves of the finger (A) is reflected from the press surface 121 to the image-capturing unit 11 through total internal reflection, and the light illuminating the ridges of the finger (A) will be absorbed by the finger (A) so as to create a fingerprint image, which is dark where there are ridges and bright where there are grooves.

However, since there is the through hole 131 in the light-diffusion plate 13, the light illuminating the center portion of the finger (A) is less than that illuminating the remainder of the finger (A). Therefore, the center portion of the finger (A) has an unsatisfactory illumination, which results in an unsatisfactory fingerprint identification rate.

Referring to FIG. 2, a fingerprint identifying system 2 disclosed in U.S. Pat. No. 5,177,802 includes an image pickup device 21, a lightguide plate 22 disposed above the image pickup device 21, and two light sources 23 disposed at two sides of the lightguide plate 22, respectively. When light emitted from the light sources 23 enters into the lightguide plate 22, the light is guided by the lightguide plate 22 to a finger (B) through total internal reflection. The light is then reflected on the contour of the fingerprint pattern of the finger (B) and reaches the image pickup device 21 to form an image of the fingerprint.

However, in the fingerprint identifying system 2, in order to permit the light from the light sources 23 to be guided by the lightguide plate 22 at accurate angles for creating the total internal refection, the assembly angle of the light sources 23 relative to the lightguide plate 22 is strictly limited. Therefore, the yield of the fingerprint identifying system 2 may be reduced due to an error of the assembly angles of the light sources 23 relative to the lightguide plate 22.

SUMMARY OF THE INVENTION

Therefore, an object of the present invention is to provide a fingerprint identifying system which has an improved identification rate.

Accordingly, the fingerprint identifying system of this invention includes a light source, a light-transmissive finger press plate, and an image-capturing unit. The light-transmissive finger press plate is disposed to receive light from the light source, and has a top face adapted to contact a finger, a bottom face, and at least one first microstructure layer formed on at least one of the top and bottom faces of the light-transmissive finger press plate for guiding the light received from the light source to uniformly scatter. The image-capturing unit is disposed below the light-transmissive finger press plate.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
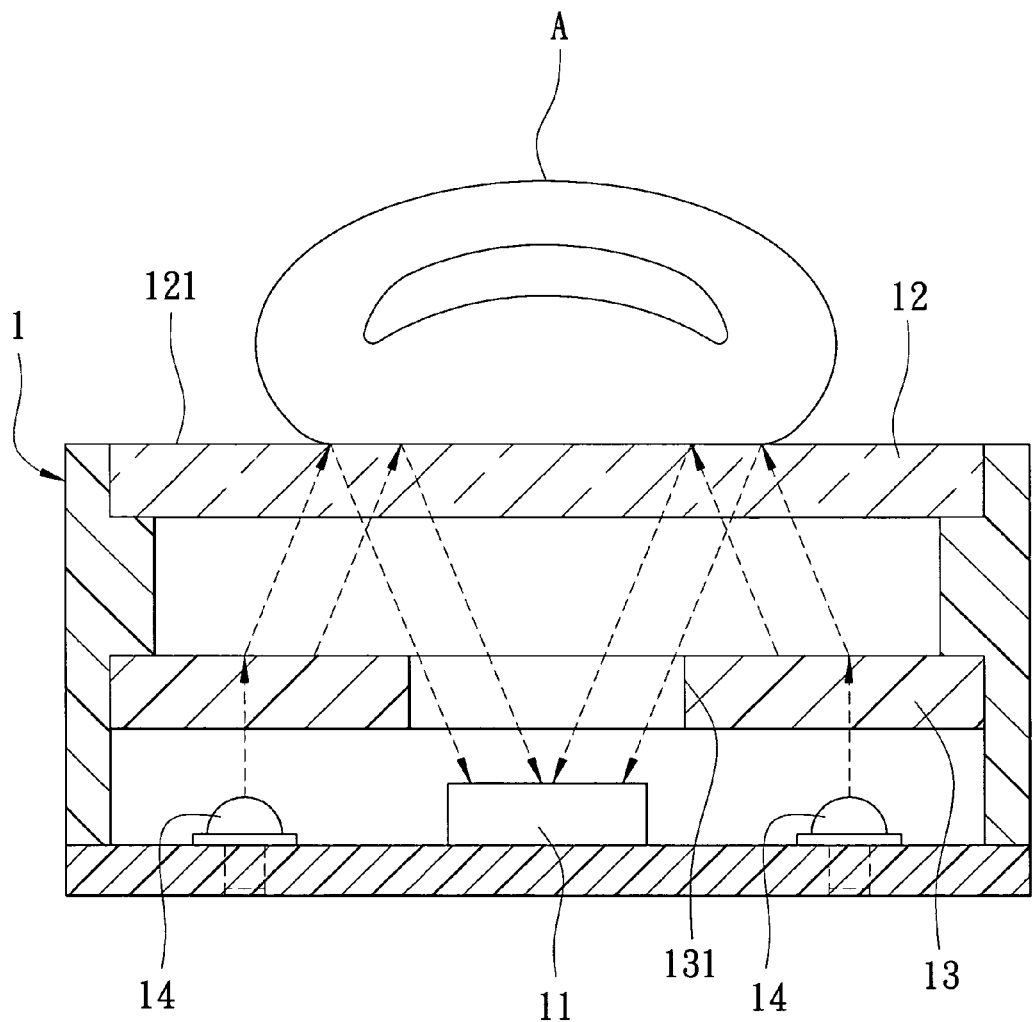
FIG. 1 is a sectional view of a conventional fingerprint identifying system.
Figure 2:
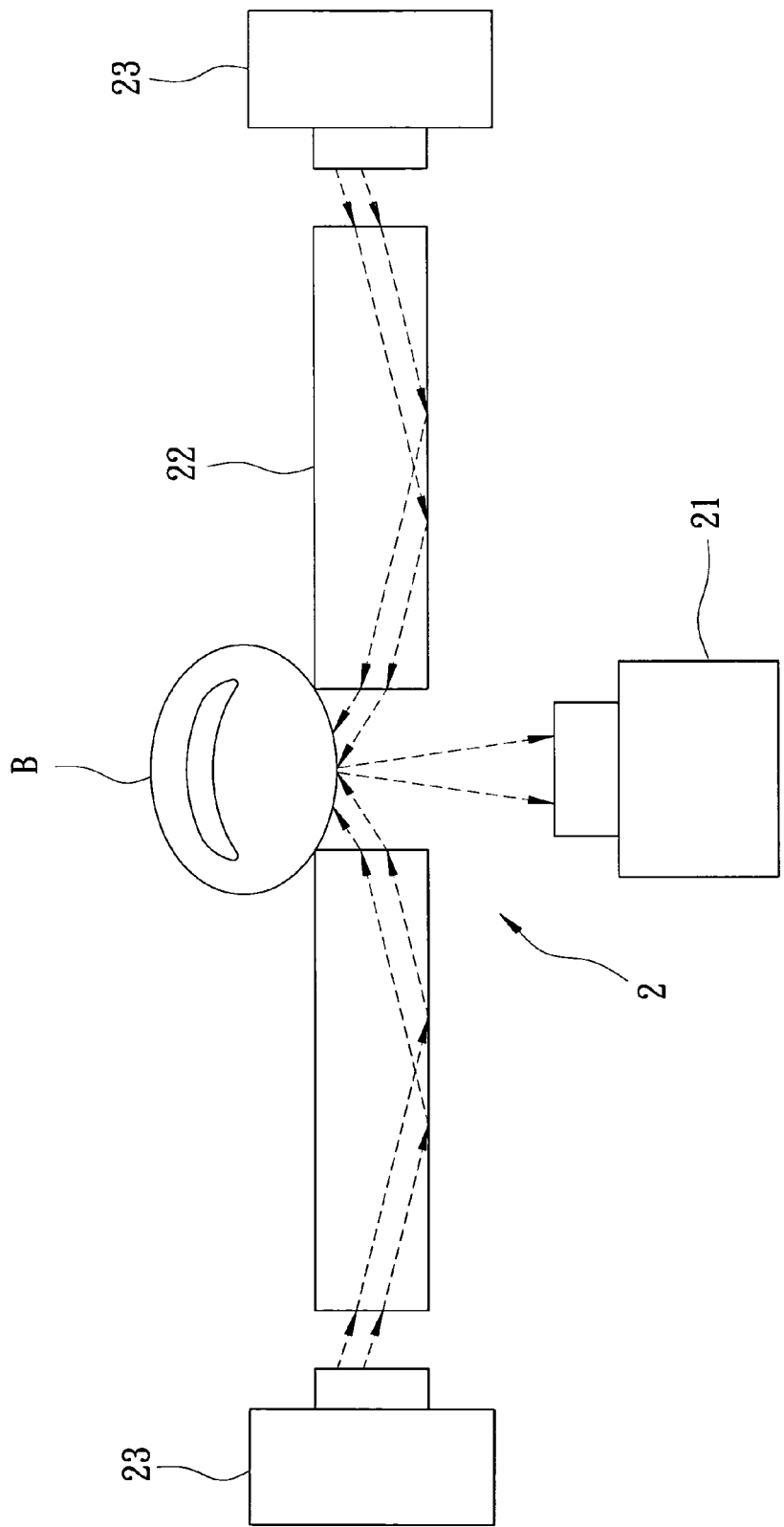
FIG. 2 is a schematic diagram of another conventional fingerprint identifying system.
Figure 3:
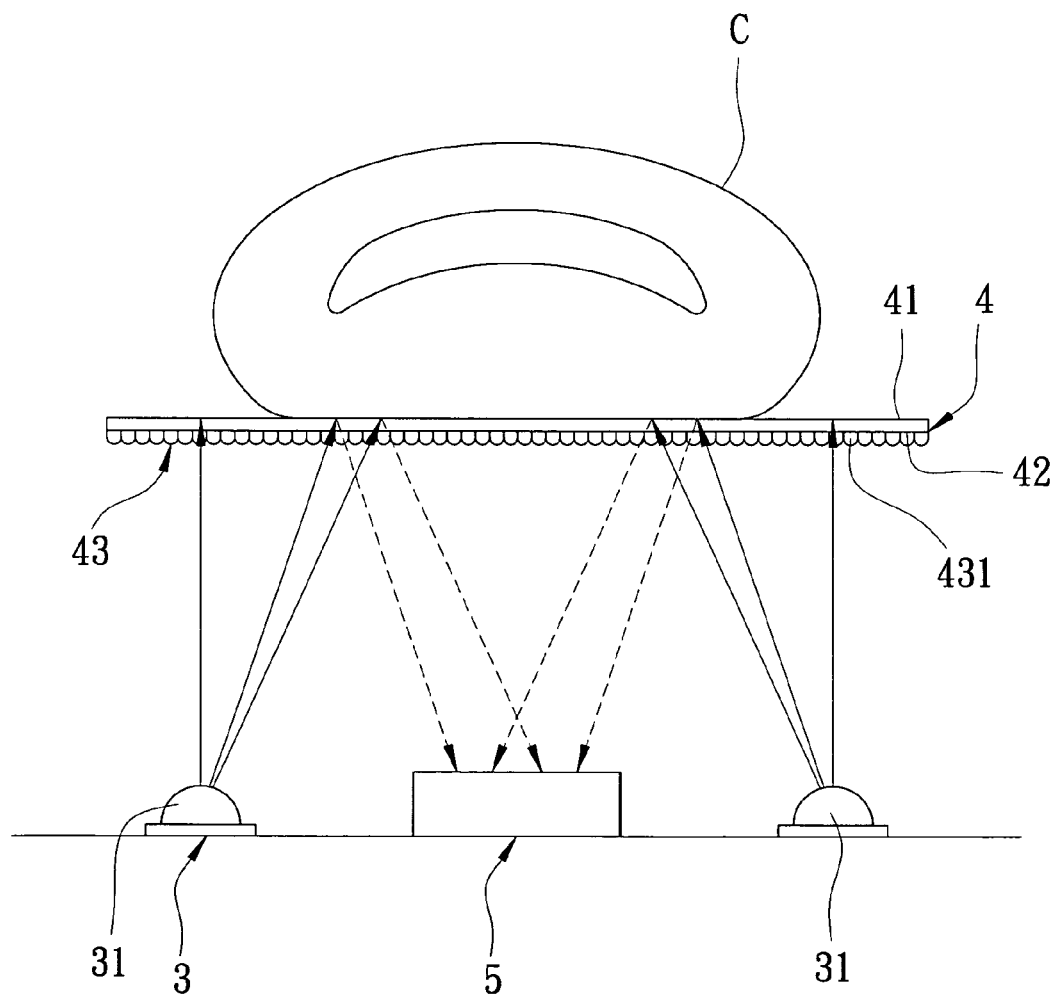
FIG. 3 is a schematic diagram of a first preferred embodiment of a fingerprint identifying system according to this invention.

Referring to FIG. 3, the first preferred embodiment of a fingerprint identifying system according to this invention includes a light source 3, a light-transmissive finger press plate 4, and an image-capturing unit 5.

The light source 3 includes two light units 31 disposed on two sides of the image-capturing unit 5. The light source 3 is disposed below the light-transmissive finger press plate 41 and emits visible light beam. The light units 31 used in this preferred embodiment are light-emitting diodes.

The light-transmissive finger press plate 4 has a top face 41 adapted to contact a finger (C), a bottom face 42, and a first microstructure layer 43. The light-transmissive finger press plate 4 is made of an optical plastic material or a light-condensing diffusion film in this preferred embodiment. The first microstructure layer 43 is formed on the bottom face 42 of the light-transmissive finger press plate 4 for guiding light received from the light source 3 to uniformly scatter. In this preferred embodiment, the first microstructure layer 43 is formed directly on and integrally with the finger press plate 4. Alternatively, the first microstructure layer 43 may be formed separately from the light-transmissive finger press plate 4. The first microstructure layer 43 includes a plurality of microstructures 431. The microstructures 431 include indentations and protrusions, which are of V-shaped cross-section, trapezoid cross-section, semi-circular cross-section, etc. In this preferred embodiment, the microstructures 431 are of semi-circular cross-section. The light-transmissive finger press plate 4 is preferably made of a MN TECH Micro lens diffuser.

The image-capturing unit 5 is disposed below the light-transmissive finger press plate 4.

Since the first microstructure layer 43 includes a plurality of the microstructures 431, the light from the light source 3 can be refracted via the microstructures 431 of the first microstructure layer 43 so as to homogeneously or uniformly scatter the light out of the first microstructure layer 43 to the top face 41 of the light-transmissive finger press plate 4. Therefore, the whole area of the top face 41 of the light-transmissive finger press plate 4 has satisfactory illumination for identifying the fingerprint.

When the light illuminates the finger (C) disposed on the top face 41 of the light-transmissive finger press plate 4, the light illuminating the grooves of the finger (C) is reflected from the top face 41 through total internal reflection to the image-capturing unit 5, and the light illuminating the ridges of the finger (C) will be absorbed by the finger (C) so as to create a fingerprint image, which is dark where there are ridges and bright where there are grooves.

It should be noted that the configuration and the density of the microstructures 431 of the first microstructure layer 43 can be specified according to the practical requirement so as to obtain an optimal illumination for identifying the fingerprint.

Figure 4:
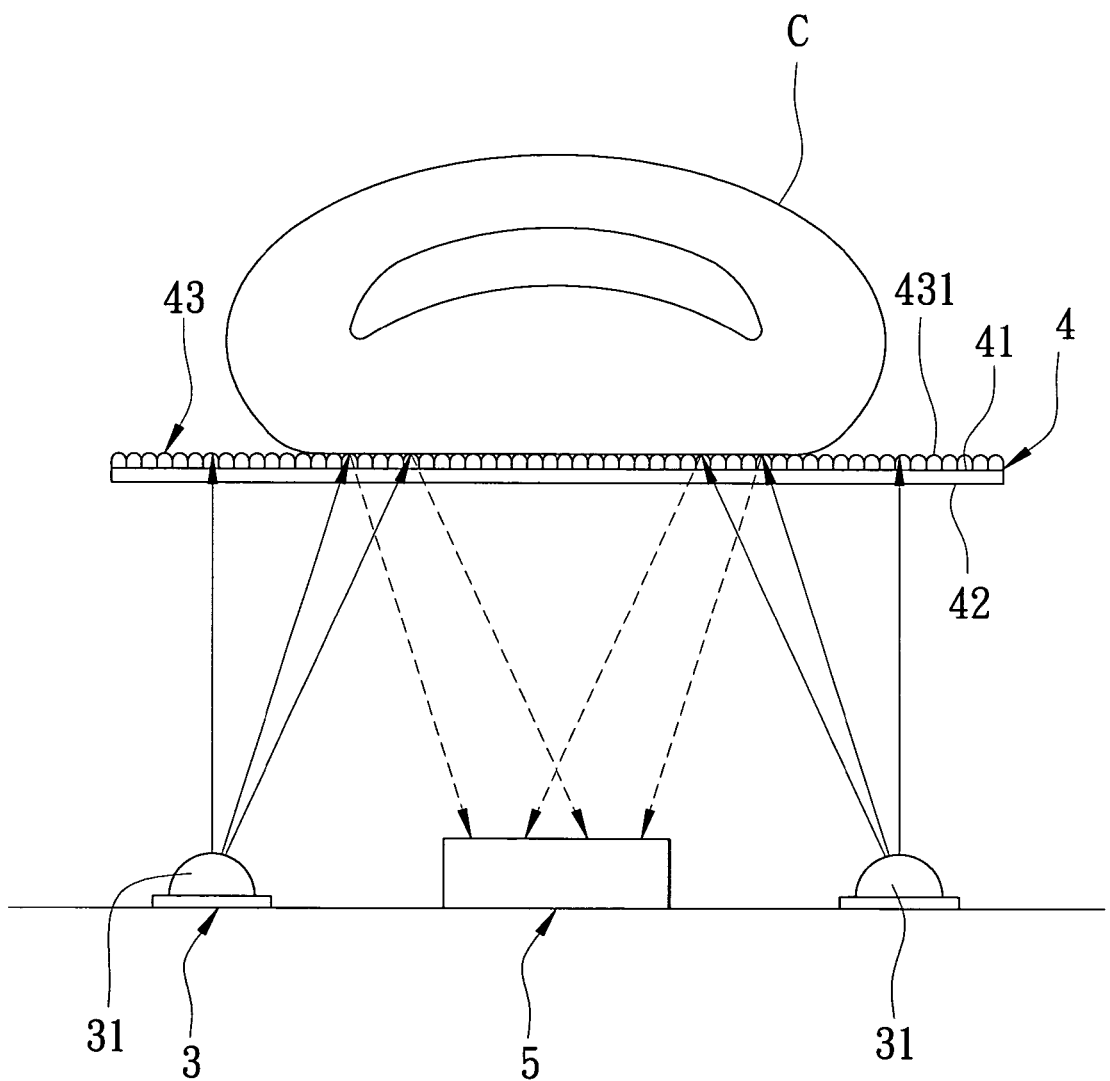
FIG. 4 is a schematic diagram of a second preferred embodiment of a fingerprint identifying system according to this invention.

Referring to FIG. 4, the second preferred embodiment of a fingerprint identifying system according to this invention is similar to the first preferred embodiment except that the first microstructure layer 43 is formed on the top face 41 of the light-transmissive finger press plate 4.

Figure 5:
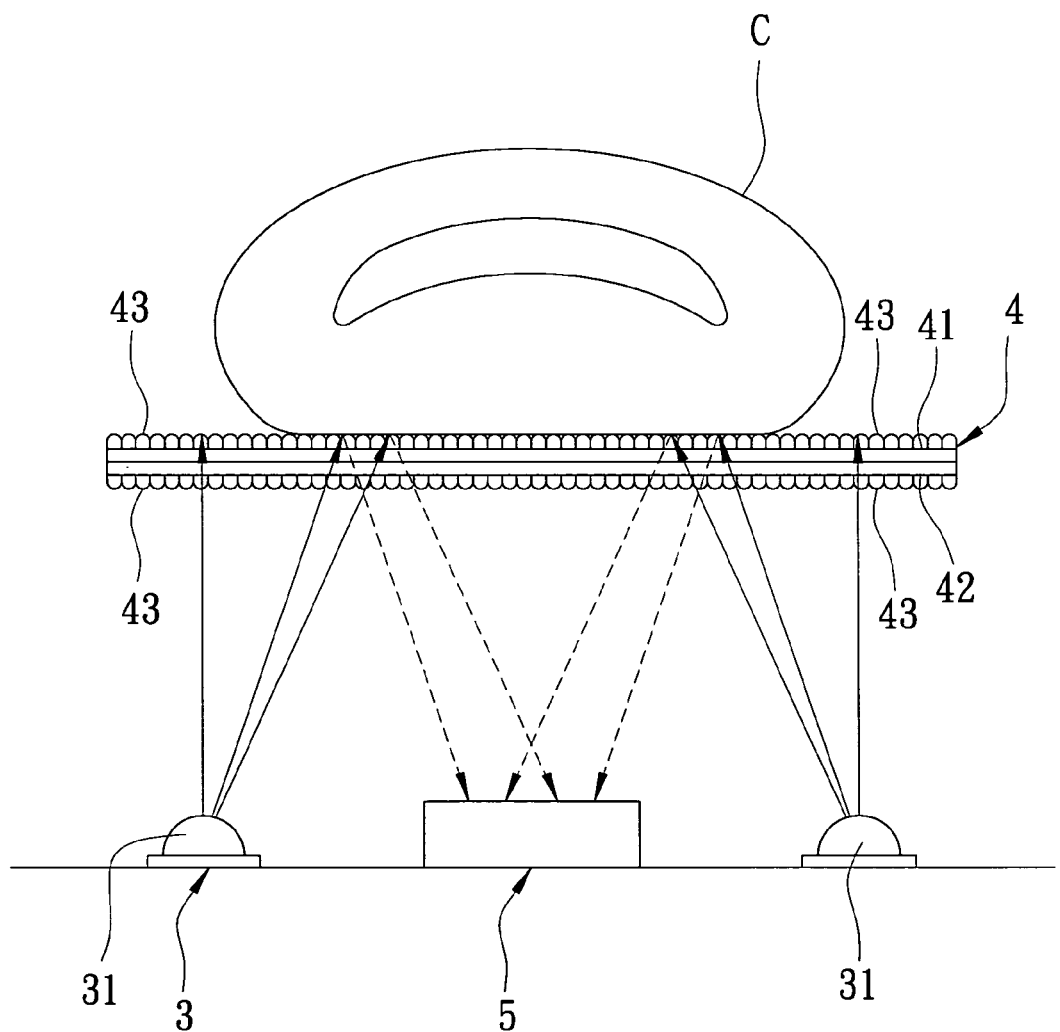
FIG. 5 is a schematic diagram of a third preferred embodiment of a fingerprint identifying system according to this invention.

Referring to FIG. 5, the third preferred embodiment of a fingerprint identifying system according to this invention is similar to the first preferred embodiment except that a pair of the light-transmissive finger press plates 4 are used in this preferred embodiment and that a pair of the first microstructure layers 43 are respectively formed on the top face 41 of one of the light-transmissive finger press plates 4 and the bottom face 42 of the other of the light-transmissive finger press plates 4.

Figure 6:
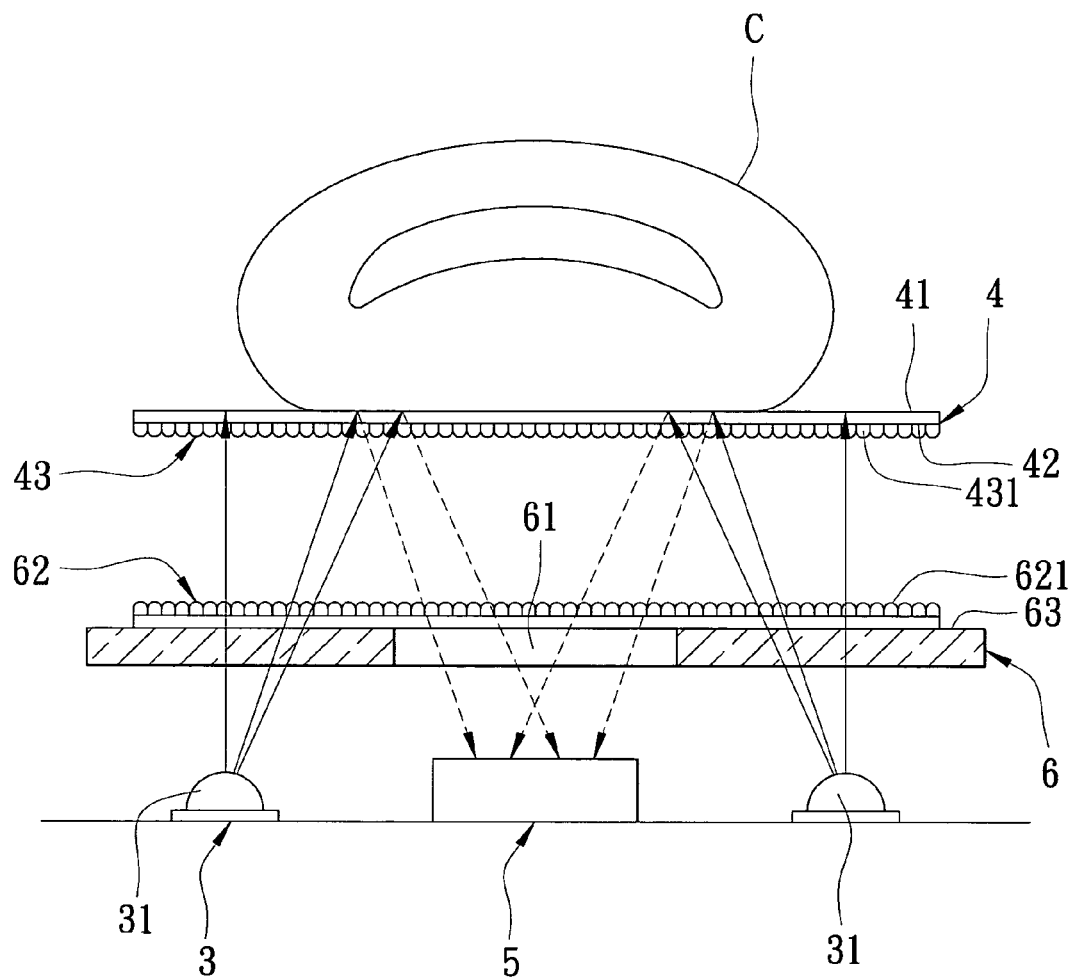
FIG. 6 is a schematic diagram of a fourth preferred embodiment of a fingerprint identifying system according to this invention.

Referring to FIG. 6, the fourth preferred embodiment of a fingerprint identifying system according to this invention is similar to the first preferred embodiment except that a light-diffusing member 6 is further disposed below the light-transmissive finger press plate 4 and above the image-capturing unit 5, and has a through hole 61 to permit the image-capturing unit 5 to receive light reflected from the finger (C). The light source 3 is disposed below the light-diffusing member 6. The light-diffusing member 6 has a second microstructure layer 62. In this preferred embodiment, the light-diffusing member 6 is a planar plate that is spaced from the light-transmissive finger press plate 4 and the image-capturing unit 5 and that has a top surface 63 facing the light-transmissive finger press plate 4 and formed with the second microstructure layer 62. The second microstructure layer 62 includes a plurality of microstructures 621. The microstructures 621 include indentations and protrusions, which are of V-shaped cross-section, trapezoid cross-section, semi-circular cross-section, etc. In this preferred embodiment, the microstructures 621 are of semi-circular cross-section.

When the light source 3 emits light to the light-diffusing member 6, the light-diffusing member 6 guides the light from the light source 3 so as to serve as a planar light source. Since the first and second microstructure layers 43, 62 are included in this preferred embodiment, the light from the light-diffusing member 6 can be refracted via the microstructures 431, 621 of the first and second microstructure layers 43, 62 so as to homogeneously or uniformly scatter the light to the light-transmissive finger press plate 4. Therefore, the whole area of the top face 41 of the light-transmissive finger press plate 4 has satisfactory illumination for identifying the fingerprint.

Figure 7:
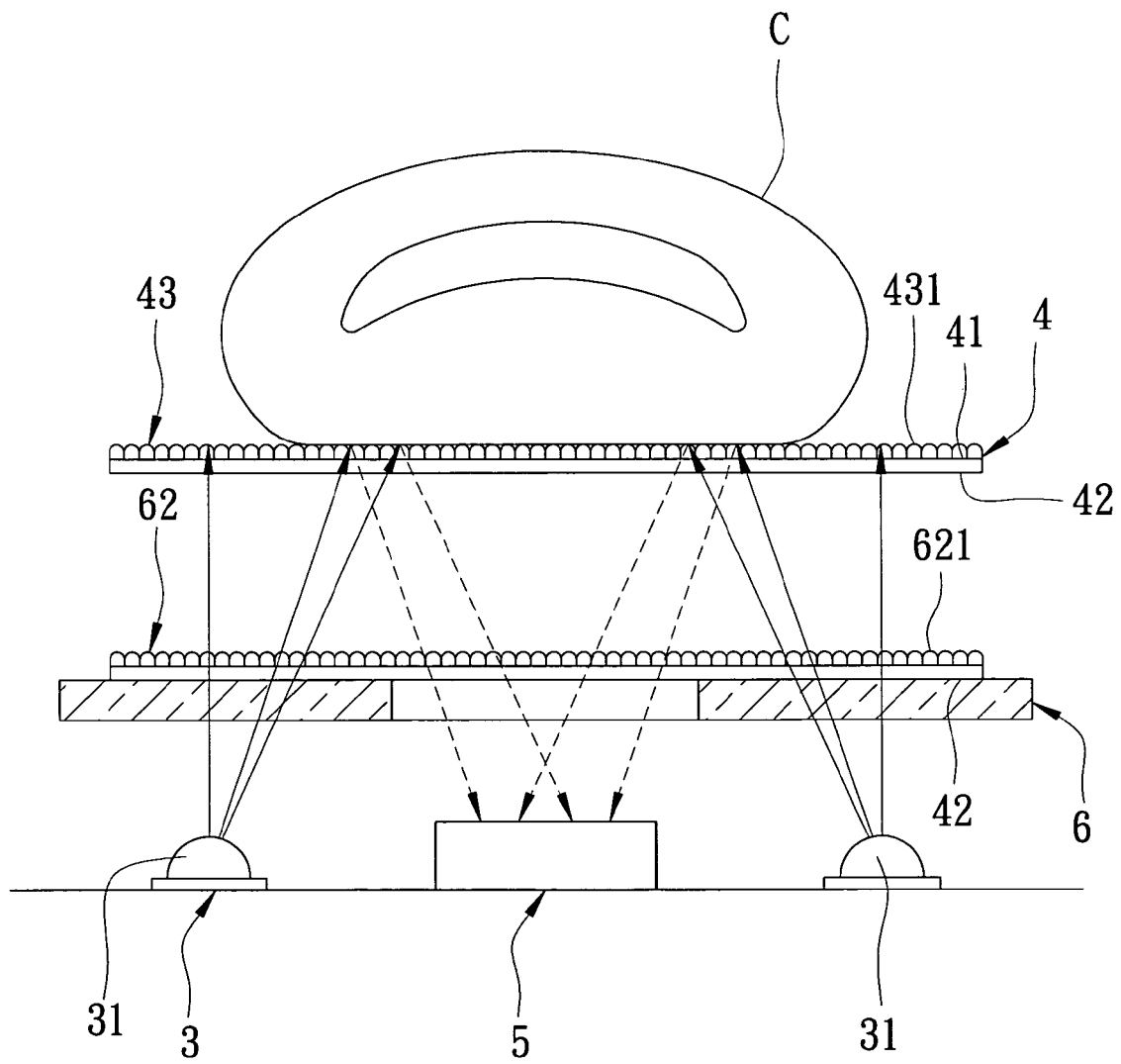
FIG. 7 is a schematic diagram of a fifth preferred embodiment of a fingerprint identifying system according to this invention.

Referring to FIG. 7, the fifth preferred embodiment of a fingerprint identifying system according to this invention is similar to the fourth preferred embodiment except that the first microstructure layer 43 is formed on the top face 41 of the light-transmissive finger press plate 4.

Figure 8:
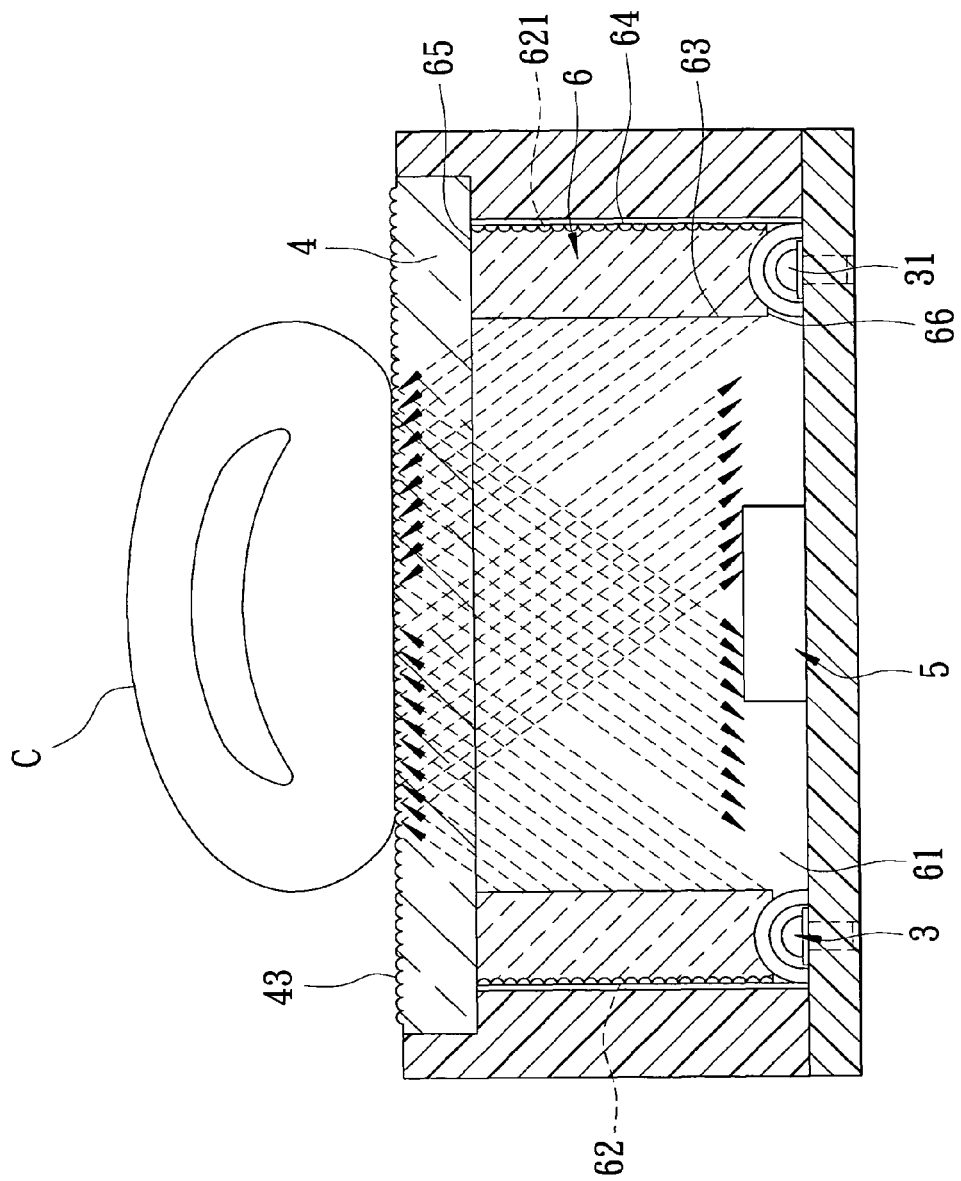
FIG. 8 is a sectional view of a sixth preferred embodiment of a fingerprint identifying system according to this invention.

Referring to FIG. 8, the sixth preferred embodiment of a fingerprint identifying system according to this invention is similar to the fifth preferred embodiment except that the light-diffusing member 6 is tubular, and has an inner periphery 63 confining the through hole 61, an outer periphery 64 surrounding the inner periphery 63, an annular top end 65 in contact with the light-transmissive finger press plate 4, and an annular bottom end 66 extending to the light source 3 so that light emitted from the light source 3 is incident on the annular bottom end 66. The second microstructure layer 62 is formed on the outer periphery 64. The image-capturing unit 5 extends into the annular bottom end 66.

Figure 9:
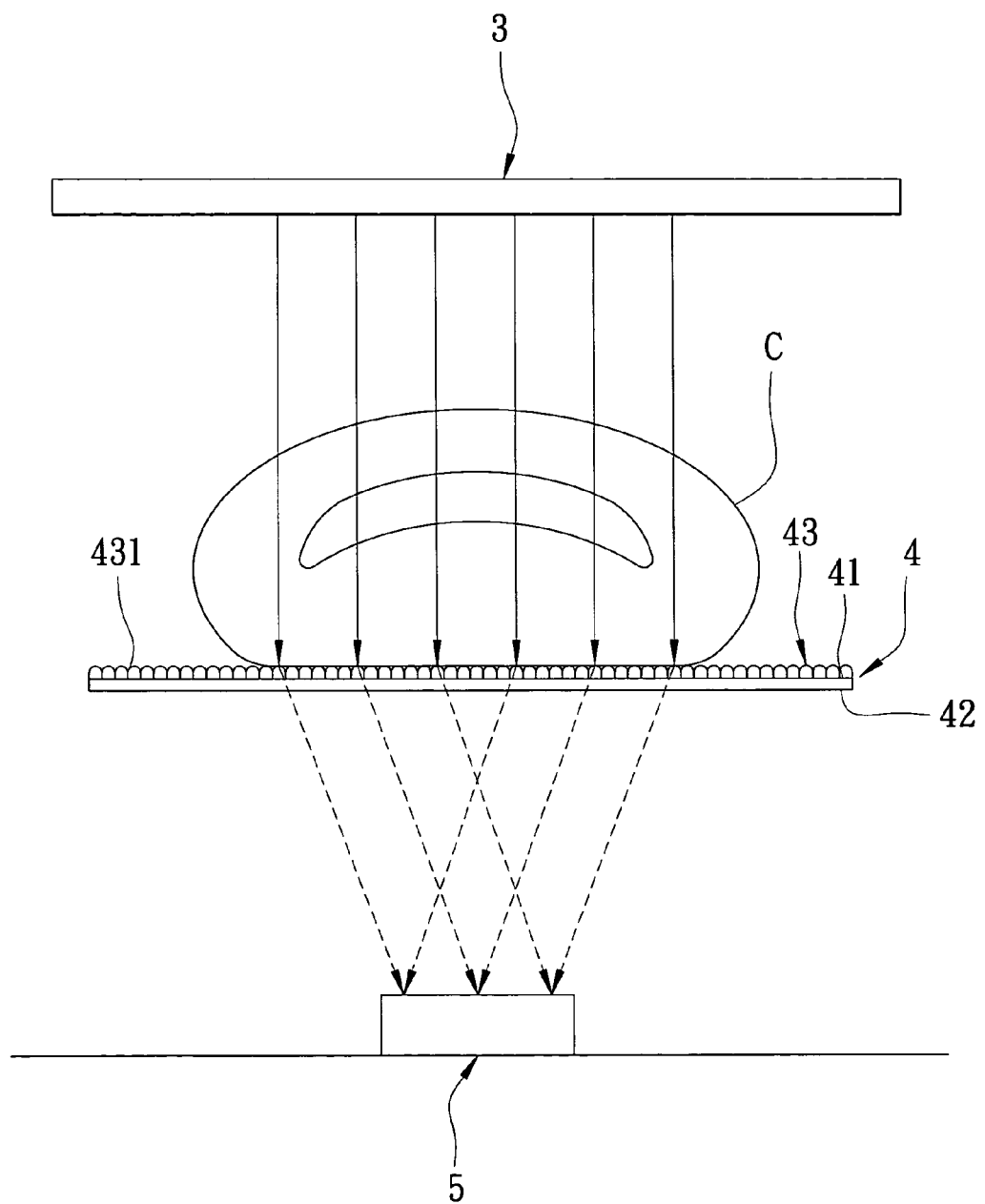
FIG. 9 is a schematic diagram of a seventh preferred embodiment of a fingerprint identifying system according to this invention.

Referring to FIG. 9, the seventh preferred embodiment of a fingerprint identifying system according to this invention is similar to the second preferred embodiment except that the light source 3 is disposed above the light-transmissive finger press plate 4. The light beam of the light source 3 is an invisible light beam which is emitted downwardly to the light-transmissive finger press plate 4. Preferably, the invisible light beam of the light source 3 is a near infrared light beam having a wavelength ranging from 680 to 940 nm.

In view of the above description, the use of the first and second microstructure layers 43, 62 can homogeneously or uniformly scatter light to the top face 41 of the light-transmissive finger press plate 4 such that the fingerprint identification rate can be enhanced. Furthermore, since the configuration and the density of the microstructures 431, 621 of the first and second microstructure layers 43, 62 can be specified according to the practical requirement, the fingerprint identifying system of the present invention can be assembled in a simple and convenient manner, and the production cost thereof can be reduced.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A fingerprint identifying system comprising:
   a light source;
   a light-transmissive finger press plate disposed to receive light from said light source, and having a top face adapted to contact a finger, a bottom face, and at least one first microstructure layer formed on at least one of said top and bottom faces of said light-transmissive finger press plate for guiding the light received from said light source to uniformly scatter;
   an image-capturing unit disposed below said light-transmissive finger press plate; and a light-diffusing member disposed below said light-transmissive finger press plate and above said image-capturing unit, and having a through hole to permit said image-capturing unit to receive light reflected from the finger, said light source being disposed below said light-diffusing member, said light-diffusing member having a second microstructure layer.

2. The finger print identifying system as claimed in claim 1, wherein said first microstructure layer is formed on said top face of said light-transmissive finger press plate.

3. The finger print identifying system as claimed in claim 1, wherein said first microstructure layer is formed on said bottom face of said light-transmissive finger press plate.

4. The finger print identifying system as claimed in claim 1, comprising a pair of said first microstructure layers respectively formed on said top and bottom faces of said light-transmissive finger press plate.

5. The finger print identifying system as claimed in claim 1, wherein said light-diffusing member is a planar plate that is spaced from said light-transmissive finger press plate and said image-capturing unit and that has a top surface facing said light-transmissive finger press plate and formed with said second microstructure layer.

6. The fingerprint identifying system as claimed in claim 1, wherein said light-diffusing member is tubular, and has an inner periphery confining said through hole, an outer periphery surrounding said inner periphery, an annular top end in contact with said light-transmissive finger press plate, and an annular bottom end extending to said light source so that light emitted from said light source is incident on said annular bottom end, said second microstructure layer being formed on said outer periphery, said image-capturing unit extending into said annular bottom end.

7. The finger print identifying system as claimed in claim 1, wherein said first microstructure layer includes a plurality of microstructures.

8. The finger print identifying system as claimed in claim 7, wherein said microstructures include indentations and protrusions.

9. The fingerprint identifying system as claimed in claim 8, wherein said indentations and protrusions are of V-shaped cross-section, trapezoid cross-section, or semi-circular cross-section.

10. The fingerprint identifying system as claimed in claim 1, wherein said light source is disposed below said light-transmissive finger press plate and emits visible light beam.

11. The fingerprint identifying system as claimed in claim 1, wherein said light source is disposed above said light-transmissive finger press plate and emits invisible light beam.

* * * * *